(12) United States Patent
Filsfils et al.

(10) Patent No.: US 10,230,605 B1
(45) Date of Patent: Mar. 12, 2019

(54) SCALABLE DISTRIBUTED END-TO-END PERFORMANCE DELAY MEASUREMENT FOR SEGMENT ROUTING POLICIES

(71) Applicant: Cisco Technology, Inc., San Jose, CA (US)

(72) Inventors: Clarence Filsfils, Brussels (BE); Rakesh Gandhi, Ontario (CA); Tarek Saad, Ontario (CA); Sagar Soni, Ontario (CA); Patrick Khordoc, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/121,535

(22) Filed: Sep. 4, 2018

(51) Int. Cl.
| | |
|---|---|
| *H04L 12/28* | (2006.01) |
| *H04L 12/26* | (2006.01) |
| *H04L 12/44* | (2006.01) |
| *H04J 1/16* | (2006.01) |

(52) U.S. Cl.
CPC .......... *H04L 43/0852* (2013.01); *H04L 12/44* (2013.01); *H04L 43/12* (2013.01)

(58) Field of Classification Search
USPC ................................. 370/252, 256, 389, 386
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

Cheng et al., "Path Segment in MPLS Based Sement Routing Network," Network Working Group, Oct. 2017, pp. 1-10.

(Continued)

*Primary Examiner* — John Pezzlo
(74) *Attorney, Agent, or Firm* — Polsinelli PC (57) ABSTRACT

The present technology is directed to a scalable solution for end-to-end performance delay measurement for Segment Routing Policies on both SR-MPLS and SRv6 data planes. The scalability of the solution stems from the use of distributed PM sessions along SR Policy ECMP paths. This is achieved by dividing the SR policy into smaller sections comprised of SPT trees or sub-paths, each of which is associated with a Root-Node. Downstream SID List TLVs may be used in Probe query messages for signaling SPT information to the Root-Nodes Alternatively, this SPT signaling may be accomplished by using a centralized controller. Root-Nodes are responsible for dynamically creating PM sessions and measuring delay metrics for their associated SPT tree section. The root-nodes then send the delay metrics for their local section to an ingress PE node or to a centralized controller using delay metric TLV field of the response message.

20 Claims, 9 Drawing Sheets

(56) References Cited

U.S. PATENT DOCUMENTS

| | | |
|---|---|---|
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Spiel et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |

(56) References Cited

U.S. PATENT DOCUMENTS

| | | |
|---|---|---|
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0272317 A1* | 9/2017 | Singla ............... H04L 41/0806 |
| 2017/0317997 A1 | 11/2017 | Smith et al. |
| 2017/0332421 A1 | 11/2017 | Sternberg et al. |
| 2017/0339706 A1 | 11/2017 | Andreoli-Fang et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Ali et al., "Performance Measurement in Segment Routing Networks with IPv6 Data Plane (SRv6)," Spring Working Group, Feb. 26, 2018, pp. 1-17.
"Cisco 10000 Series Router Quality of Service Configuration Guide, Chapter 20: Configuring Quality of Service for MPLS Traffic," Cisco Systems, Inc., Updated Nov. 17, 2013, pp. 1-34.
"Cisco ASR 5x00 Mobility Management Entity Administration Guide," Version 15.0, Last updated Jun. 13, 2014, Cisco, 1-266.
"Enterprise Mobility 7.3 Design Guide, Chapter 11: Cisco Mobility Services Engine," Cisco Systems, Inc., Updated Apr. 20, 2015, 8 pages.
"I Love WiFi, The difference between L2 and L3 Roaming Events," Apr. 1, 2010, 6 pages.
"Quality of Service Regulation Manual," ITU 2017, pp. 1-174.
"Wi-Fi Location-Based Services 4.1 Design Guide," May 20, 2008, 206 pages.
Afolabi, Ibrahim, et al., "Network Slicing & Softwarization: A Survey on Principles, Enabling Technologies & Solutions," Mar. 21, 2018, pp. 1-24.
An, Xueli, et al., "Virtualization of Cellular Network EPC Gateways based on a Scalable SDN Architecture," IEEE, Feb. 12, 2015, pp. 1-7.
Antonioli, Roberto, et al., "Dual Connectivity for LTE-NR Cellular Networks," Research Gate, Sep. 3-6, 2017, pp. 171-175.
Bekan, Adnan, et al., "D5.1: Machine Learning Algorithms Development and Implementation," 2016-2018 eWINE Consortium, 23, 2016, pp. 1-72.
Bogale, Tadilo Endeshaw, et al., "Machine Intelligence Techniques for Next-Generation Context-Aware Wireless Networks," arxiv.org, Jan. 12, 2018, pp. 1-10.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.
de Sousa, Nathan F. Saraiva, et al., "Network Service Orchestration: A Survey," IEEE Communications Surveys & Tutorials, Mar. 23, 2018, pp. 1-30.
Doyle, Matthew G., "An IP Address Management Solution for a Server Solution Provider," A Dissertation Submitted to The University of Liverpool, Sep. 28, 2005, 116 pages.
Galvan T., Carlos E., et al., "Wifi bluetooth based combined positioning algorithm," International Meeting of Electrical Engineering Research ENIINVIE 2012, Procedia Engineering 35 (2012), pp. 101-108.
Geller, Michael, et al., "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Herb, Daniel, et al., "ROAUM: How to Unblock Roaming IoT Using BLockchain," available at https://uploads-ssl.webflow.com/5987a06baeea4300016b7bd9/5a7a6d6cee5bc400010a08f2_Roaum_Roaming_IoT_Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18, 2017, 19 pages.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

(56) References Cited

OTHER PUBLICATIONS

Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

* cited by examiner

SCALABLE DISTRIBUTED END-TO-END PERFORMANCE DELAY MEASUREMENT FOR SEGMENT ROUTING POLICIES

TECHNICAL FIELD

The present technology pertains to scalable performance measurement in computer networks. More specifically, it is directed to a scalable implementation of distributed delay measurement for Segment Routing Policies.

BACKGROUND

Segment-routing (SR) technology greatly simplifies network operations and is conducive to a Software-Defined Networking paradigm. Segment Routing may be utilized with both Multi-Protocol Label Switching (SR-MPLS) and Internet Protocol version 6 (SRv6) data-planes. Built-in Performance Measurement (PM) is one of the essential requirements for a successful implementation of this technology.

Segment Routing policies are used to steer traffic through a specific, user-defined path using one or more Segment Identifier (SID) list for Traffic Engineering (TE). In SR network, end-to-end performance delay on SR Policies must be closely measured and monitored in order to ensure that the provisions of Service Level Agreements (SLAs) are met. Service providers are expected to detect and correct delay bound violations for the services in sub-second interval for certain applications such as tele-medicine, on-line gaming, stock market trading and many mission critical applications. In the Segment Routing context, the provision of end-to-end low latency services with rapid performance degradation detection becomes an essential service requirement, especially when considering that Segment Routing based network Slicing may serve as a core technology for implementing 5G ready networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems and methods, are disclosed that provide a highly scalable implementation of delay performance measurement across Segment Routing Policies. Embodiment of the technology are directed to a method comprising a step of partitioning a segment routing policy domain, established between an ingress node and an egress node, into a plurality of sections, wherein each sections includes a Root-Node and one or more paths originating from the Root-Node and spanning the section. Disclosed embodiments further comprise a step of creating one or more local delay measurement sessions at each Root-Node, wherein each of the one or more local delay measurement sessions corresponds to a different path from the one or more paths originating from the Root-Node. Moreover embodiments may include an additional step of calculating one or more end to end delay metrics for the segment routing policy domain by utilizing the one or more local delay measurements from each of the Root-Nodes along the segment routing policy domain. In some embodiments the paths spanning each of the sections and the corresponding Root-Nodes are designated by one or more delay measurement query messages sent by the ingress node. Alternatively designation of the Root-Nodes and the corresponding SPT trees may be provided by a centralized controller entity. In some embodiments of the disclosed technology, end-to-end delay measurement carried out for a Segment Routing Policy also includes the internal switching fabric delay within each of the Root-Node router as well as any delay incurred on the input and output Line Cards of the Root-Node routers.

Example Embodiments

Disclosed are systems, methods, and non-transitory computer-readable storage media for scalable implementation of distributed Performance Delay Measurement for Segment Routing Policy Path. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Extended Traffic Engineering (TE) link delay metrics (i.e., minimum delay value) may be used as an optimization metric or an accumulated delay bound to compute paths for SR policies. The actual delay values of an SR policy may be very different than the path computation results (i.e., sum of TE link delay metrics) due to several factors, such as queuing in a router, etc. Therefore, there is a need to monitor the end-to-end delay experienced by the traffic sent over the SR Policy to ensure that the delay does not exceed the requested "upper-bound" and violate SLAs. Furthermore, accurate measurement of end-to-end delay values may be used as important indicators for key operations such as activating candidate-path or segment-list(s) of the SR Policy in forwarding plane. End-to-end delay values may also be used as indication to de-activate the active candidate-path or Segment List(s) of the SR policy in forwarding.

Figure 1:
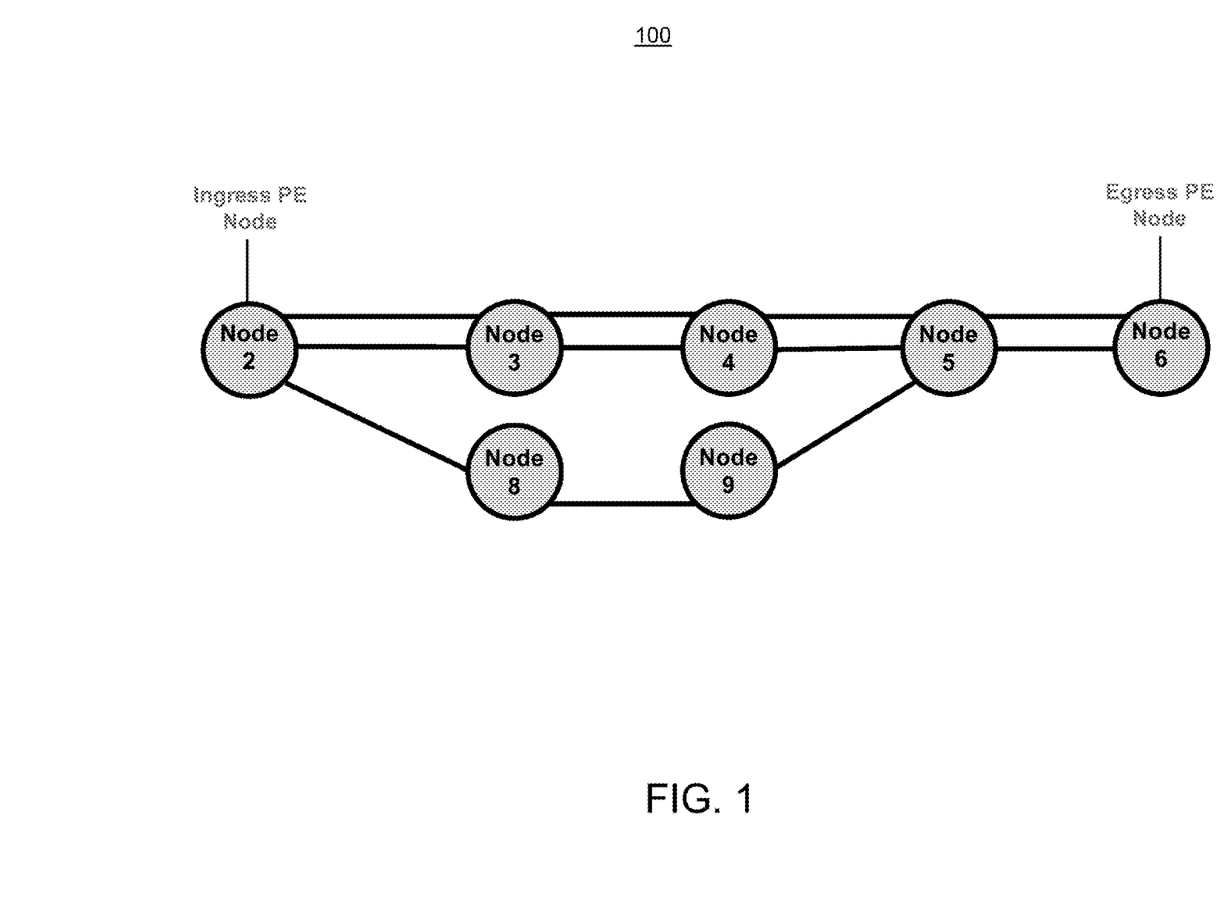
FIG. 1 illustrates, an example Segment Routing topology for an end-to-end Segment Routing policy, in accordance to some embodiments of the present invention.

FIG. 1 illustrates an example Segment Routing network topology for implementing a Segment Routing (SR) Policy 100. The SR policy 100 is established between ingress Provider Edge (PE) Node 2 and egress PE Node 6, with ECMP paths on Nodes 2, 3, 4 and 5. In the example SR policy 100, there are 2 ECMPs for each one of the 4 hops to get from the ingress PE Node 2 (through Node 3, 4 and 5) to the egress PE Node 6, which provides ($2^4$=16) sixteen end-to-end forwarding paths. The alternative end-to-end path from ingress PE Node 2 to egress PE Node 6 consists of three single path hops (through Node 8, 9 and 5) and one dual path hop (Equal Cost Multiple Paths or ECMP) from Node 5 to egress PE Node 6, which provides (1*1*1*2=2) two end-to-end forwarding paths. Therefore SR topology 100 consists of a total of (16+2=18) eighteen end-to-end forwarding paths that may be used by traffic flows when directed onto this SR Policy.

With reference to SR policy 100, the delay experienced by the traffic flow on each forwarding path may be different. Hence, Performance Measurement (PM) process needs to create 18 different delay measurement sessions on Ingress PE node 2. This results in a scale issue, as PM packets are injected by the control plane on ingress node and punted to the control plane on egress node for processing (although timestamp is provided in hardware). In a large network, there can be up to 128 Equal Cost Multi Paths (ECMP) between two nodes of an SR Policy. This can rapidly lead to a scaling problem as the number of end-to-end paths scales exponentially with the number of hops ('n' hops with 128 ECMP per hop=$128^n$ end-to-end forwarding paths). The result may be a large number of end-to-end forwarding paths requiring very large number of Performance Measurement (PM) sessions for calculating end-to-end delay performance for all of the forwarding paths. Furthermore, due to policing mechanism such Local Packet Transport Service (LPTS) policer and platform-related Packets Per Second (PPS) rate limits for punting packets in hardware (e.g. 5000 PPS on ASR9K LC), an SR node can only send Performance Measurement (PM) probe packets, for delay/jitter measurements, every few minutes for a certain forwarding path. This may results in very slow detection of SLA degradation. The excessive amount of packet processing required may also result in excessive CPU usage in control-plane.

Figure 2:
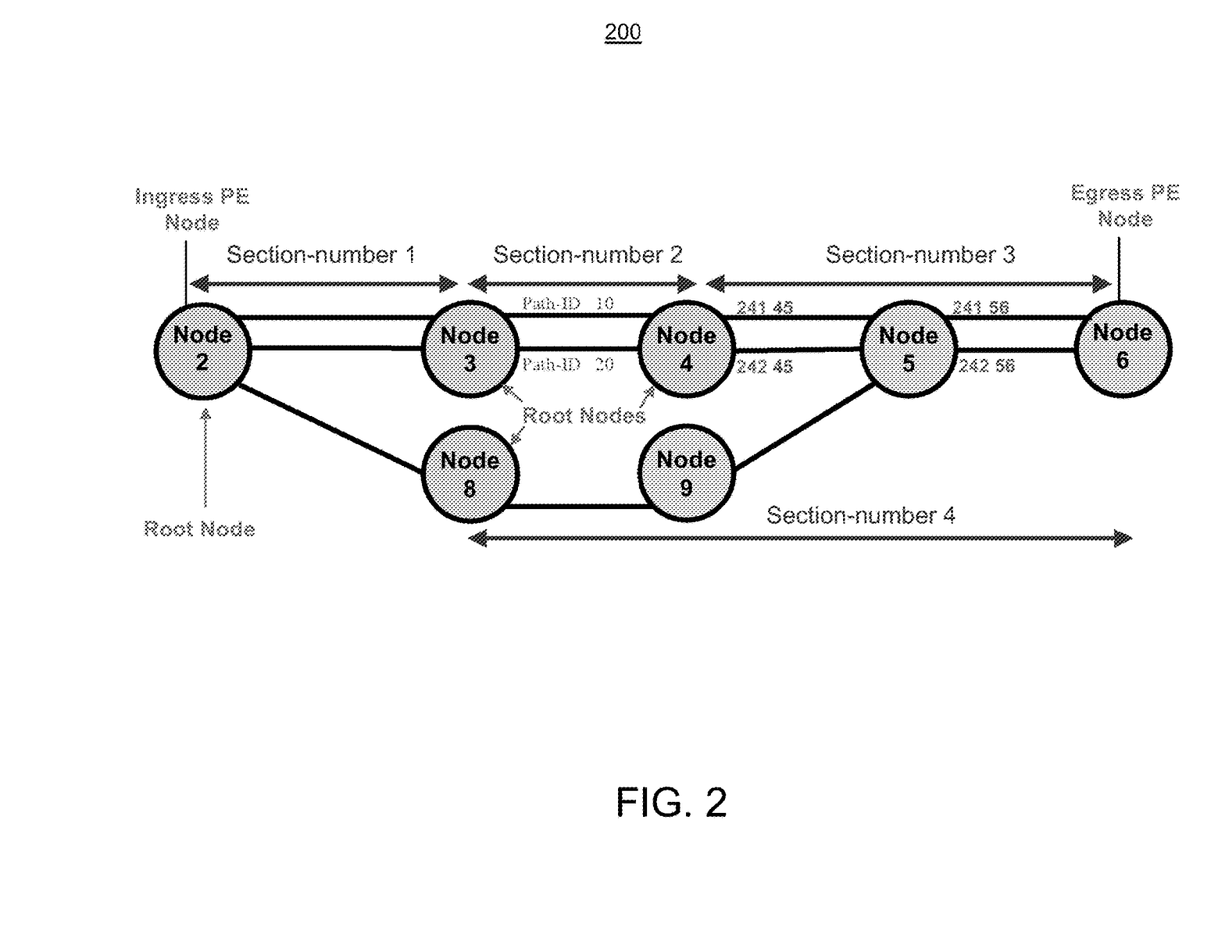
FIG. 2 illustrates a Segment Routing Policy with Root-Nodes and sub-path trees (SPT) in accordance to some embodiment of the present technology.

Performance measurement is about collecting statistical data for minimum, maximum and average delay metrics. IP/UDP based probing may be a potential option for collecting relevant delay metrics for an SR Policy. IP/UDP header source-port/source-address/destination-address can be used to take advantage of the hashing function in forwarding for ECMP paths. However, due to different hashing functions on each node along the SR Policy path, the actual end-to-end forwarding path of the probe packet, for which a delay value is measured, cannot be easily identified. This may limit the corrective action to the SR Policy candidate-path level only. Moreover, this approach does not provide an scalable solution for multi-hop SR Policy with many ECMP paths on each hop (i.e., 32*32*32 total end-to-end ECMP paths). Assuming a probe interval of 10 seconds to measure delay of each ECMP path of the SR Policy (by sending say 10 Probe query messages for it to measure min/max/average delay/jitter), it would take (32*32*32*10/60/60/24=) 3.8 days to measure the delay metric of the SR Policy FIG. 2 illustrates an exemplary SR policy 200 configured for distributed delay PM measurements, in accordance to some embodiments of the present technology. In the SR policy 200, the ingress PE (Node 2) breaks down the SR Policy into multiple smaller ECMP sub-paths (corresponding to Shortest Path Tree (SPT) constructions) called ECMP Sections. This is achieved, in accordance to the example embodiment of FIG. 2, by designating one or more Root-Nodes and the corresponding SPT trees for each Root-Node in order to distribute the PM delay measurements for the SR Policy. Considering the exponential increase in the number of forwarding paths as a function of hop count, it may be expected that breaking down an SR Policy into 2 or 3 sections (i.e., sub-paths or SPT trees) would be sufficient to significantly reduce the number of forwarding paths and hence the required PM sessions. For example, partitioning a SR path/policy that is 4 hops long and has 32 available ECMPs per hop into two equal sections reduces the number of forwarding paths from ($32^4$=) 1048576 paths to ($32^2$+ $32^2$=) 2048 paths.

PM delay measurement query message may include one or more newly defined downstream SID List (D-SID) TLVs in order to identify the SPT tree on a Root-Node. PM probe query packets for session setup are punted on all ingress line cards on Root-Nodes of the SR Policy. Root-Node of each section (sub-path SPT tree) creates PM sessions dynamically for PM delay measurement using the information from the received PM query message. The Root-Node is responsible for delay measurement for its local section and collecting the delay metrics for downstream sections at the same time.

PM probe response packets may contains the newly defined delay metric TLV for each section (sub-path SPT tree) and is sent by the Root-Node to the previous Root-Node which can add its local delay metric TLV therein before sending it upstream. Root-Nodes may alternatively send delay metric TLV directly to the ingress PE node.

The ingress node may build an entire end-to-end forwarding path SPT tree of the SR Policy (using adjacency SIDs) and assign unique Path-ID values to each forwarding path and send this path information in the downstream SID List TLVs to each Root-Node along the SR Policy. By using Path-ID information a Root-Node may separately notify the delay metric of each ECMP path of the local segment. Path-ID also allows a Root-Node that does the aggregation of the delay metrics for all ECMP paths to separately notify the delay metric of the segment when there are more than one downstream Root-Nodes, i.e. Path-ID can identify parts of the SPT tree terminating at a specific downstream Root- Node. However, if a Root-Node has only one other adjacent Root-Node, the ingress Node may simply send the Root-Node, the node/prefix SID of its adjacent Root-Node so that the Root-Node can then compute ECMP SPT tree to its neighboring adjacent Root-Node and create PM sessions for all the equal cost paths dynamically.

Referring back to the example SR topology 200. The ingress PE node (node 2) breaks down the SR Policy 200 into 4 sections, with Nodes 2, 3, 4 and 8 designated as the Root-Nodes for Section-number 1, Section-number 2, Section-number 3 and Section-number 4, respectively. Root-Node 3 in SR topology 200 is adjacent only to downstream Root-Node 4. Therefore the ingress Node 2 may simply send the node/prefix SID of the Root-Node 4 to Root-Node 3. This will enable Root-Node 3 to compute ECMP SPT tree to Root-Node 4 and dynamically create PM sessions for all the equal cost paths. In this case, Path-ID is not used.

Turning back to FIG. 2, the ingress PE node (node 2) creates 3 PM sessions corresponding to its three local ECMP paths terminating at its adjacent Root-Nodes (Node 3 and Node 8). Subsequently, the ingress PE sends out PM query messages to the next Root-Nodes on the SR Policy path (i.e., Node 3, and Node 8 as illustrated in FIG. 2). The PM query message sent to Node 3 may contain relevant downstream SID list (D-SID) TLVs. In case of Root-Node 3 there will be two downstream SID List TLVs, one TLV (i.e., TLV 1) may provide information with regards to available forwarding paths through Section-number 2 and the other TLV (i.e., TLV2) may provide information with regards to available forwarding paths through Section-number 3.

For example TLV1 may comprise:
  <Section-number2, Path-ID10, 16003, 24134>
  <Section-number2, Path-ID20, 16003, 24234>
While TLV2 may comprise:
  <Section-number3, Path-ID100, 16004, 24145, 24156>
  <Section-number3, Path-ID200, 16004, 24245, 24156>
  <Section-number3, Path-ID300, 16004, 24145, 24256>
  <Section-number3, Path-ID400, 16004, 24245, 24256>

In case of Root-Node 8, the PM query message sent by ingress PE Node 2 to Root-Node 8 may comprise of one downstream SID List TLV, (i.e., TLV 3) to provide information with regards to available forwarding paths through Section-number 4.

For example TLV3 may comprise:
  <Section-number4, Path-ID50, 16008, 16009, 16005, 24156>
  <Section-number4, Path-ID60, 16008, 16009, 16005, 24256>

Upon receiving the PM query message with downstream SID List TLV, Root-Node 3 identifies itself as a Root-Node based on recognizing the top SID (16003 in TLV 1) as its own prefix-SID. Subsequently Root-node 3 dynamically creates the corresponding PM sessions for the top TLV (TLV1). In this case, Root-Node 3 creates 2 different PM sessions corresponding to the two different paths traversing Section-number 2 (reported in TLV1) and computes a corresponding delay metrics for each of them. PM response generated by Root-Node 3 in response to PM query message containing downstream SID List TLV 1 may comprise:
  <Section-number2, Path-ID10, 3, 34>
  <Section-number2, Path-ID20, 3, 34'>

Root-Node 3 then removes the TLV (i.e. TLV1) for which it created the sessions from the received PM query message from ingress Node 2 and forwards the query to the downstream Root-Node 4.

Upon receiving the PM query message with downstream SID List TLV, Root-Node 4 identifies itself as a Root-Node based on recognizing the top SID (16004 in TLV2) as its own prefix-SID. Root-node 4 then dynamically creates the corresponding PM sessions for the top TLV paths (TLV2 paths). In this example, Root-Node 4 creates 4 different PM sessions corresponding to the four different paths traversing Section-number 3 (reported in TLV2 as Path-ID 100, 200, 300 and 400) and computes a corresponding delay metrics for each of them. In this example, PM response generated by Root-Node 4 in response to PM query message containing downstream SID List TLV 2 may comprise:
  <Section-number3, Path-ID100, 16004, 24145, 24156>
  <Section-number3, Path-ID200, 16004, 24245', 24156>
  <Section-number3, Path-ID300, 16004, 24145, 24256'>
  <Section-number3, Path-ID400, 16004, 24245', 24256'>

Root-Node 4 then removes the TLV (i.e. TLV2) for which it created the sessions from the received PM query message, and forwards the query downstream. Root-Node 6 will receive the PM query message and send PM response message back to the ingress PE Node 2, completing the setup.

As described above, in order to carry out the PM measurement, Root-Nodes dynamically creates local PM sessions for all locally originating ECMP paths in response to received PM probe query messages. The Root-Node then starts running probes along these paths in order to measure delay metrics for the said paths. As such, each Root-Node independently measures the PM delay values for each section (sub-path) including all its ECMP paths.

Figure 3:
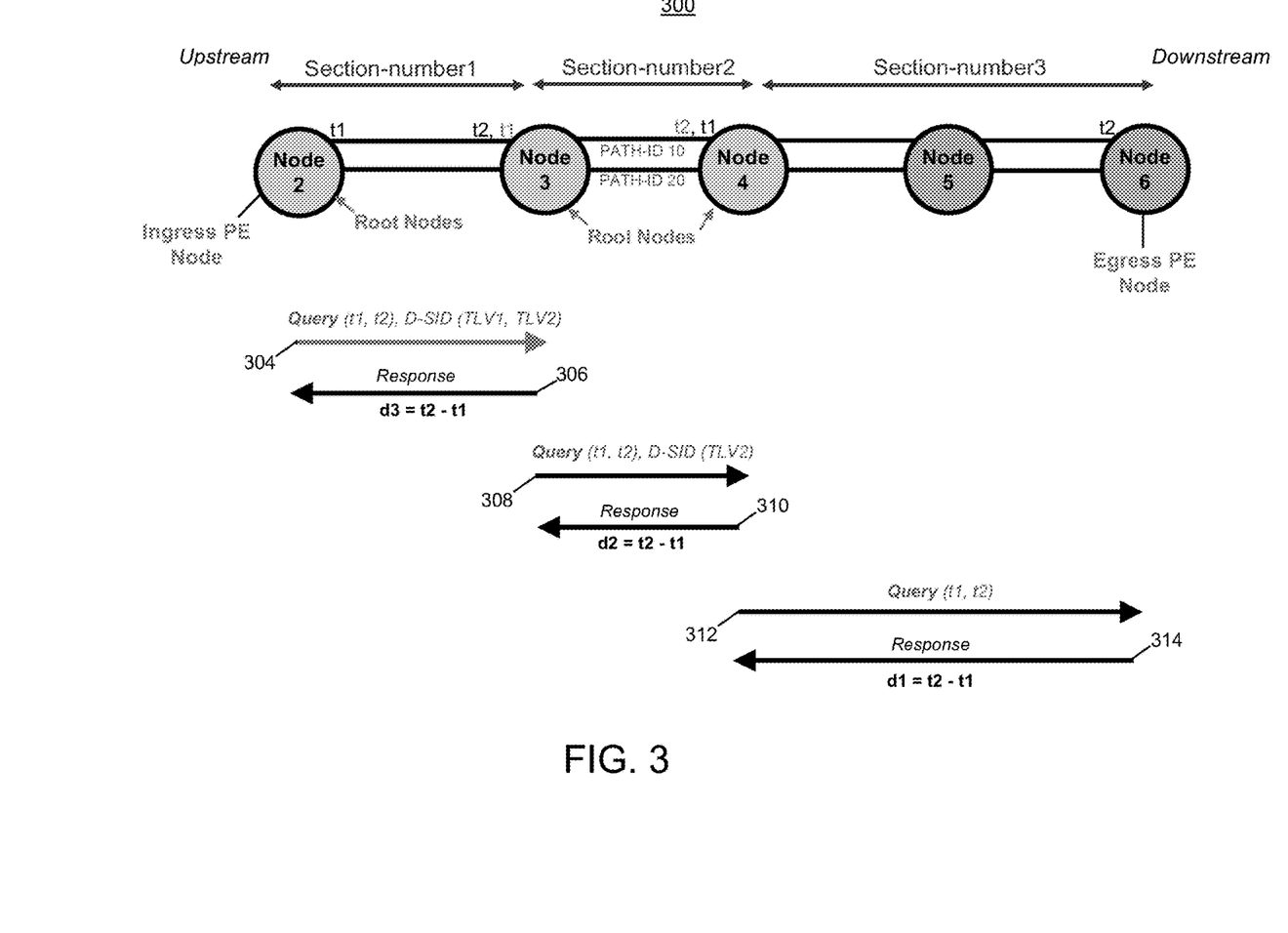
FIG. 3 illustrates an operation involving PM query generation for distributed creation of PM sessions required for implementing distributed performance delay measurement on an SR policy, in accordance to some embodiments of the present technology.

FIG. 3 illustrates an exemplary method, according to some embodiments, for PM query generation and subsequent PM session creation in response to, for example, the generated PM queries. This is illustrated in the context of an exemplary SR topology 300. Turning back to FIG. 3, a PM probe query 304 is generated by the Ingress PE Node (Node 2) and sent to neighboring Root-Node (Node 3). PM query message 304, destined for Node 3, contains sub-path information for Section-number 2 (in TLV1) and Section-number 3 (in TLV2). In response to PM query message 304, Node 3 generates a PM response message 306 containing the delay metrics (d3) for its local Section (sub-path/SPT tree). Node 3 then removes TLV 1 from the header of the Query message 304, which is associated with its local section, and forwards the PM query message (308) containing sub-path information for Section-number 3 (in TLV2) to Node 4. Upon identifying itself as the Root-Node (by verifying the top SID in the downstream SID list in TLV2), Node 4 sends a PM response message 310 with its delay metrics (d2) back to Node 3. Node 4 then removes TLV 2 from the PM query message 308, and forwards a PM query (312) to Node 6. Subsequently Node 6, upon receiving PM query 312 generates a response 314 with its delay metric (d1) and send it to Node 4.

In some embodiment, Root-node may send the downstream measured delay (timestamp t2 minus timestamp t1 i.e. PM response 306) in the upstream probe response message 306 (i.e. for each ECMP path separately using their Path-IDs). In some embodiments Root-node may optionally aggregate the delay metrics for all ECMP paths of the Section SPT tree before sending it upstream to reduce the processing load on the CPU of the ingress PE node. The ingress node and Root-Nodes send the subsequent probe query messages without downstream SID list TLVs.

In some embodiment PM query response may be generated on-demand. In on-demand mode, Root-Node may only respond when a PM probe query message is received. In response to receiving a PM query message, Root-node may send, in its PM probe response, the delay metric of the local Section as well as for all the downstream sections from where it may have received corresponding PM response messages with delay metrics. A Root-Node may locally store delay metrics TLV it has received from downstream Root-Nodes, until it receives a probe query packet from an upstream Root-Node.

Figure 4:
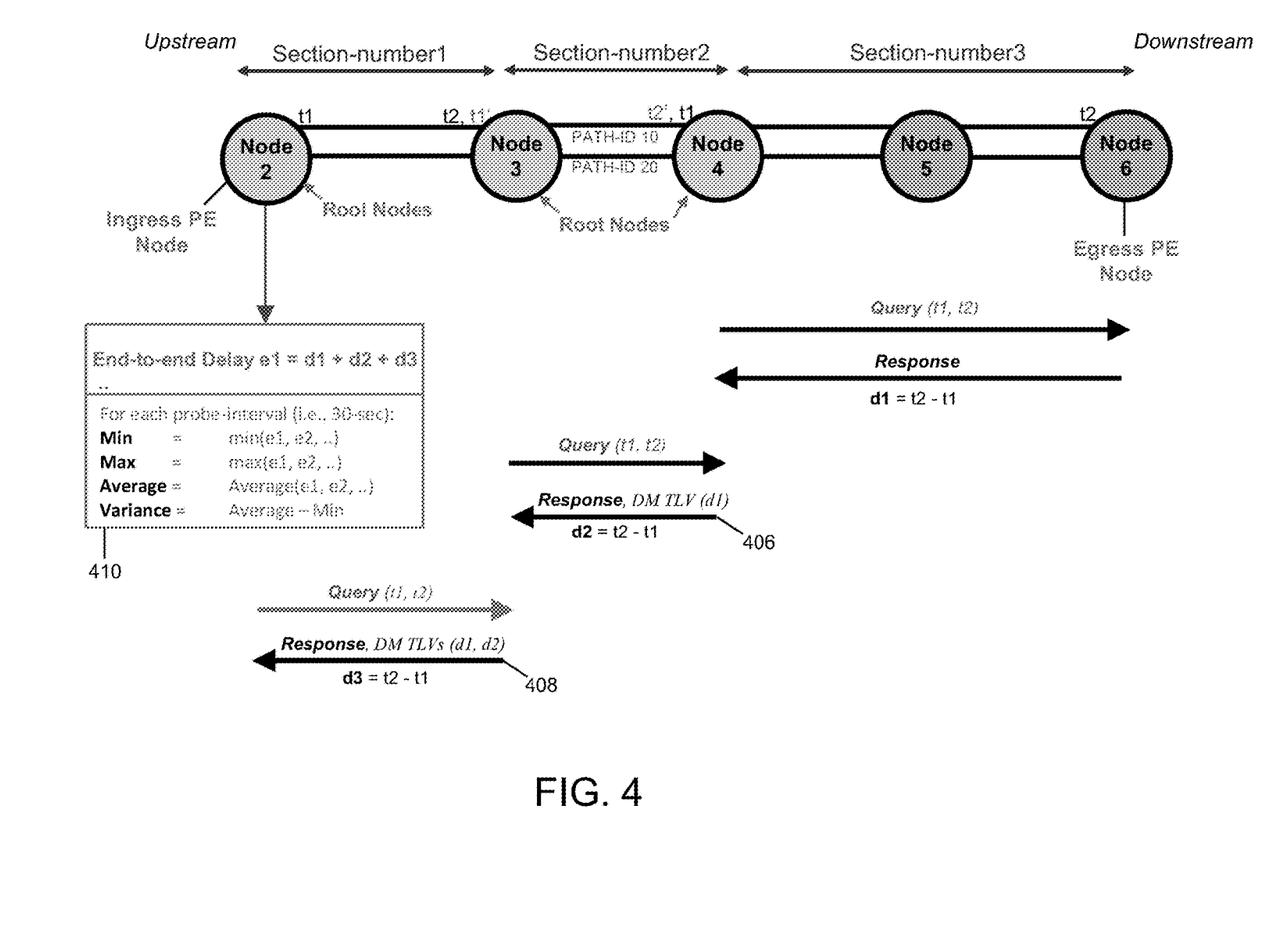
FIG. 4 illustrates an operation involving PM response message generation for distributed performance delay measurement on an SR policy, in accordance to some embodiments of the present technology.

FIG. 4 illustrates an exemplary method, according to some embodiments, for PM response generation provided in response to, for example, upstream PM query messages. This is illustrated in FIG. 4 in the context of an exemplary SR topology 400. Turning back to FIG. 4, PM sessions running on Root-Node 3 generates delay measurement (d2) for its local section 2 (Section-number 2) while also collecting delay metric (d1) for section 3 (Section-number3) sent via PM response message 406 from Root-Node 4. Similarly, PM session running on Node 2, does the delay measurement (d3) for its local Section (Section-number1) while also collecting the delay metrics (d2) for Section-number 2 and delay metric (d1) for Section-number 3. Delay metrics d1 and d2 are provided by the PM response message 408 sent from Root-Node 3 (in the same probe response message) as shown in the FIG. 4.

Some embodiments of the present invention are directed to an unsolicited mode of operation. In the unsolicited mode, A Root-Node may send PM probe response message directly to the ingress node only in response to a delay metric crosses a threshold, (i.e., without receiving any probe query message first). This operation mode is conducive to rapid detection of Service Level Agreement violations.

The delay metric for a SR Policy may be computed by adding the delay metrics of all the Sections (SPT trees) of the SR Policy, which may have been collected from all the consecutive Root-Nodes along the path. In an SR Policy configured for distributed delay performance measurement, the ingress PE Node may be aware of the SPT paths of the various Sections as well as the corresponding Root-Nodes. Therefore, the ingress PE Node can correctly add the delay metrics of different Sections to produce end-to-end delay measurement for different SR paths across several ECMP sections (e.g. by adding delay metrics of Section 1, 2 and 3 or by adding delay metrics of Section 1 and 4—with reference to the SR topology illustration in FIG. 1).

The delay metrics of a Section includes the delay across all the relevant links and the internal fabric delay within the routers, as well as both ingress and egress Line Card delays. Using the delay values from each PM probe response packet (which includes delay values for all downstream SPT tress), an ingress PE Node can compute different metrics (i.e., minimum, maximum, average, variance, etc.) for the end-to-end delay parameter. This is illustrated by element 410 in FIG. 4.

With reference to some of the described embodiments, any platform related minor measurement errors on the processing side of the ingress Root-Nodes will be in the order of nanoseconds. Accordingly, embodiments of the present technology allow for scaling up of the delay metrics measurement to accommodate large number of ECMP paths of SR Policy which cannot otherwise be supported by currently existing schemes.

As described above, Root-Nodes dynamically creates PM sessions in response to received PM probe query message (s). In some embodiments, if there is already a PM session present on the Root-Node due to a request for another SR Policy, the Root-Node may re-uses the existing PM session instead of creating a new PM session. This can help significantly reduce the number of PM sessions in the network thereby further improving the scalability of the technology.

According to some embodiment of the present technology, in case of a significant change in a delay metric of a Section, the ingress node of SR policy may be notified quickly with an unsolicited message that can be used to trigger a faster protection switch-over. Furthermore, If delay metric(s) associated with a Section or combination of several Sections exceed a delay bound requested by the SR Policy, the ingress node may immediately invalidate the corresponding segment-list of the SR Policy. This also allows to keep the "link" delay metric threshold value higher so as to avoid excessive Interior Gateway Protocol (IGP) flooding of the link delay metrics in the network. This may be advantageous over using path computation cost which is computed by adding the hop-by-hop link delay metrics from the topology database.

The method proposed, in accordance to some embodiments, may be used to monitor selective Section(s) of an SR Policy that may be more likely to experience performance delay degradation (for example, due to congestion or underlying optical network issues). This obviates a need for the ingress Node to monitor all ECMP paths of the SR Policy and allows the ingress Node to only request a specific Root-Node to measure performance delay metric of its local Section.

Figure 5:
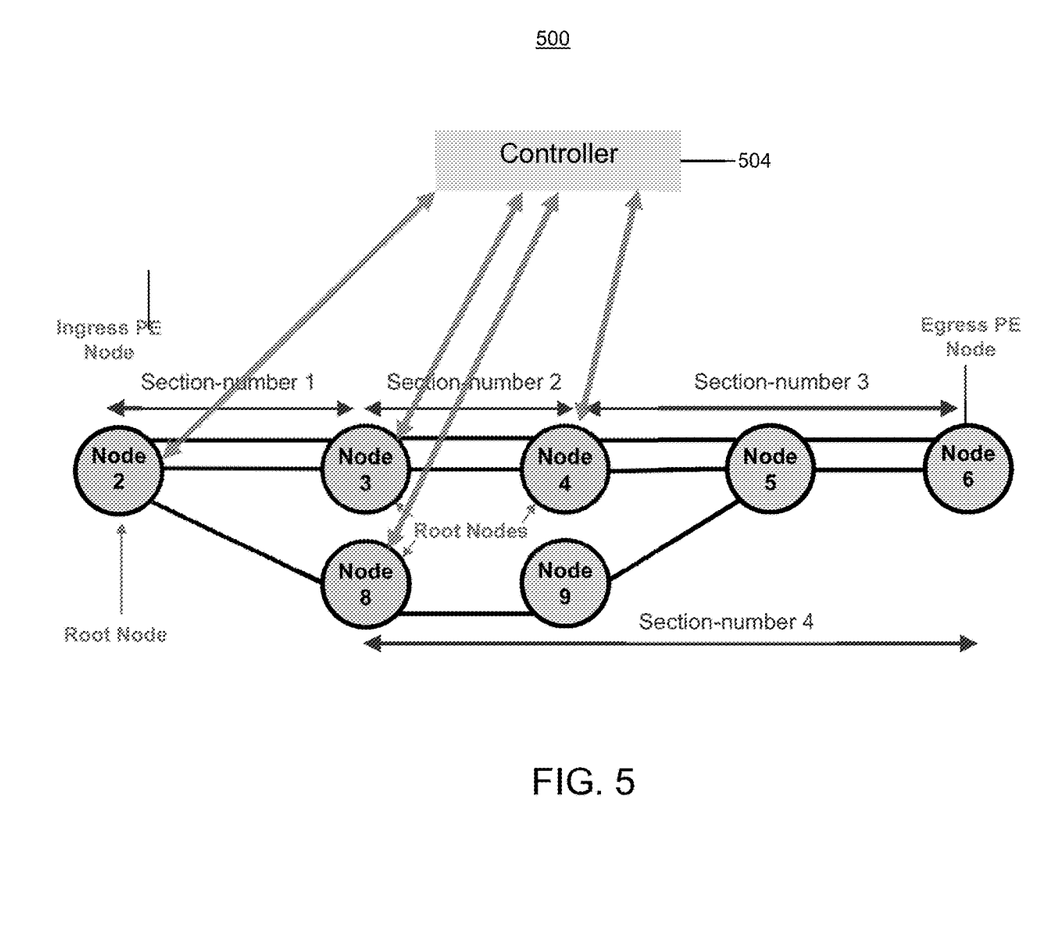
FIG. 5 illustrates an operation involving a PM session set up and PM response processing with a centralized controller, in accordance to some embodiments of the present technology.

In some embodiments of the present technology a centralized controller may be used, instead of PM probe query messages, in order to identify and set up Root-Nodes and Sections with SPT trees for the purpose of implementing a distributed scalable PM delay measurement for an SR Policy. An exemplary centralized controller based distributed delay measurement system 500 is illustrated in FIG. 5. In order to implement distributed delay measurement for an SR Policy, the centralized controller 504 associated with the exemplary system 500 in FIG. 5 identifies and configures Root Nodes with corresponding sub-path SPT trees. Upon being established and subsequently probed by the controller 500, Root-Nodes may send the delay metrics associated with their respective local Sections (sub-path) via PM response messages to the centralized controller 504. The centralized controller 504 may then aggregates the delay metrics from different Sections of the SR Policy to compute one or more end-end delay metrics for the SR Policy. According to some embodiments, Root-Nodes may send the requested metrics to a centralized controller as a message generated in response to a probe query message received from the ingress PE Node. Alternatively, the metric transmission from Root-Nodes to centralized controller may be unsolicited, triggered instead by other external/internal factors (i.e., when a specified threshold is crossed.)

According to some embodiments, distributed performance delay measurement may be implemented as Node-SID (Prefix-SID) based performance delay measurement. In this variation, each node in the network measures performance delay metrics based on all ECMP forwarding paths to the next-hop (or next several hops) Node-SIDs (Prefix-SIDs). This delay measurement may then be used for detecting performance delay degradation between any two nodes in the network.

As described above, the delay metrics of a Section includes delay of all links as well as internal fabric delay within the routers, in addition to the ingress and egress Line Card delays. In order to ensure accuracy for end-to-end delay measurement, root-node does stitching of PM sessions to be able to get punt time-stamp and inject time-stamp as close as possible. The stitching of PM session on the ingress Line Card, in accordance to some embodiment of the present technology, will be described in reference to FIG. 6.

Figure 6:
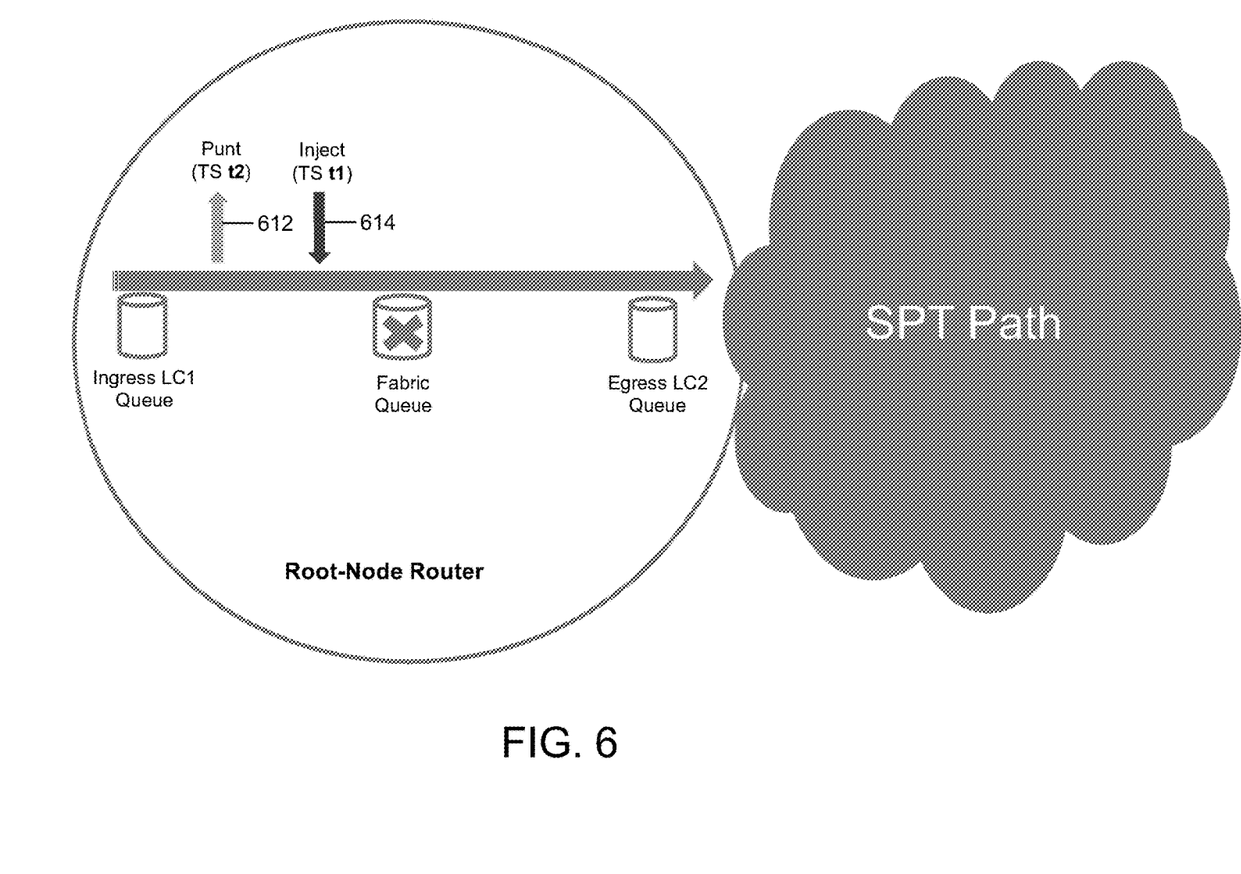
FIG. 6 illustrates an operation involving stitching of PM sessions on ingress Line Card for distributed performance delay measurement on SR policy, in accordance to some embodiments of the present technology.

Turning now to FIG. 6, the transmit (TX) timestamp (t1) on the PM query is added by the ingress Line Card on the querier Node (Node generating a probe or PM query message). This means the fabric queue delay and egress Line Card (outgoing) queue processing delay are accounted for in determination of timestamp (t1). The receive (RX) timestamp (t2) is added in the probe query packet on the ingress Line Card on the responder node after the packet has undergone ingress queuing. This means that ingress (incoming) queue processing delay is accounted for in determination of timestamp (t2).

Turning back to FIG. 6, the Line Card on a Root-Node where the received PM probe query packet is punted (612) with Receive (RX) timestamp (t2), injects the PM query packet back (614) on the same Line Card to get the Transmit (TX) timestamp (t1) for the downstream Segment, as shown in the FIG. 6 (this phenomena is referred to as stitching).

Figure 7:
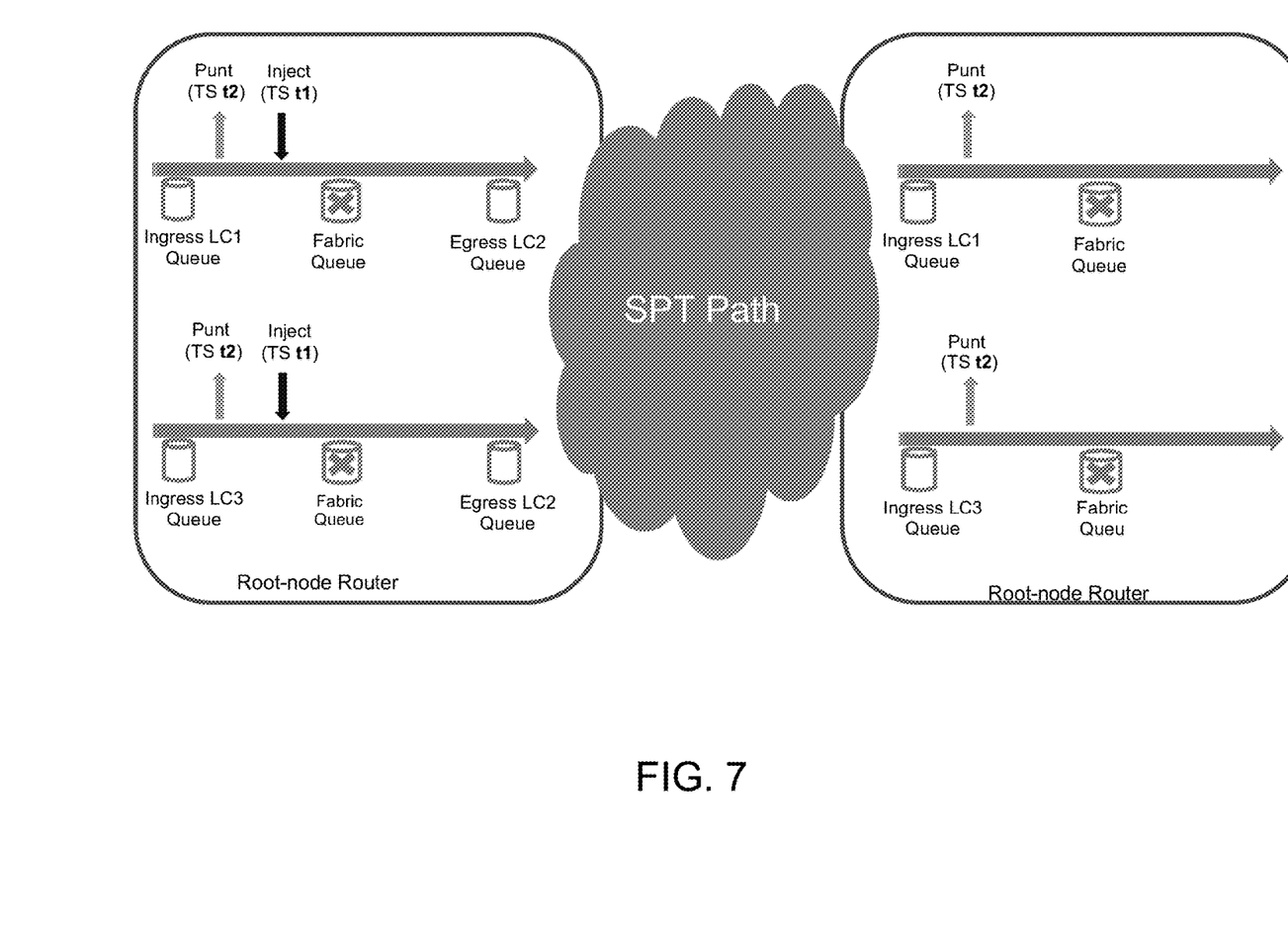
FIG. 7 illustrates an operation involving stitching of PM sessions on different ingress Line Cards for distributed performance delay measurement on SR policy, in accordance to some embodiments of the present technology.

Some embodiments involve stitching of PM sessions on different ingress Line Cards. An illustrative example is provided in FIG. 7. In order to ensure accuracy for end-to-end delay measurement, root-node does stitching of PM sessions to be able to get punt time-stamp and inject time-stamp as close as possible.

Root-nodes need to account for the queuing delay between the ingress LC towards the fabric and to the egress LC. In other words, delay measurement will include all fabric congestion between any two Line Cards on the path of the SR Policy. This is because PM probe packets will traverse these paths. For this, Root-Nodes needs to create PM sessions starting from each ingress Line Card on the node where incoming PM sessions are terminated. For example, if there are N number of ECMP paths in the Section on Root-Node, and there are M ingress Line-Cards where incoming PM sessions are terminated, then Root-Nodes need to create N*M number of PM sessions. This prescription for the number of required PM sessions may be alleviated as Root-Nodes are likely to re-use the PM sessions on the ECMP paths in its Section across multiple SR Policies (sharing the forwarding paths).

Figure 8:
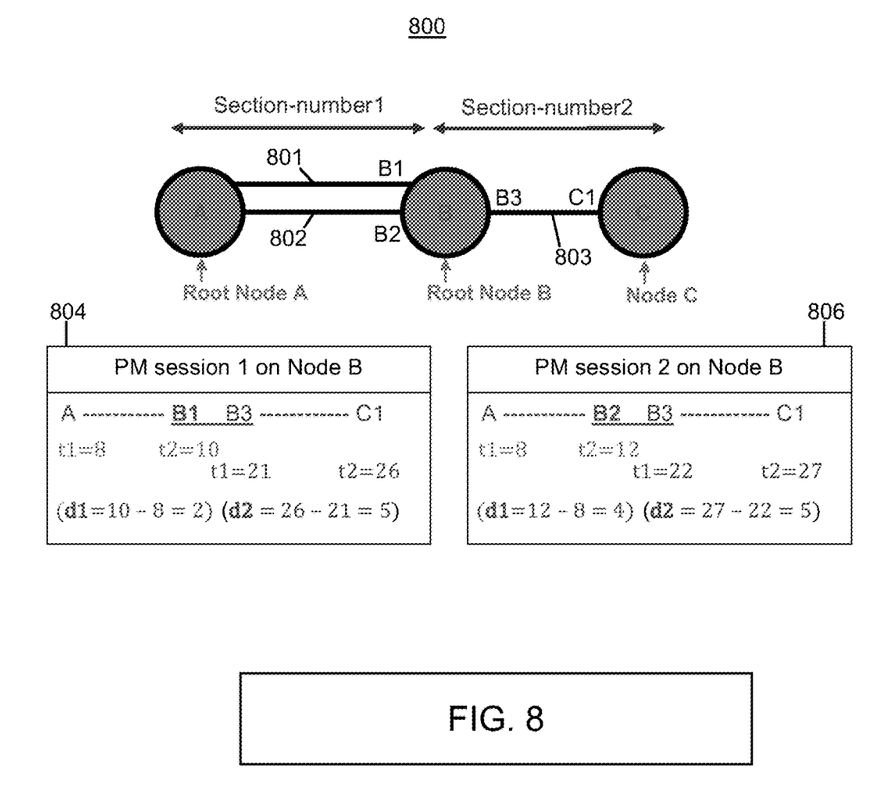
FIG. 8 illustrates an example SR Policy for end-to-end delay computation involving PM session stitching, in accordance to some embodiments of the present technology.

An example of End-to-end computation stitching is provided in FIG. 8. The exemplary SR policy 800, illustrated in FIG. 8, is implemented on nodes A-B-C. There are 2 ECMP paths (801 and 802) between Nodes A and B and there is one ECMP path (803) between Nodes B and C. B1 and B2 represent ingress Line Cards on Root-Node B while B3 represents the egress Line Card on Root-Node B. As illustrated in FIG. 8, Node B creates 2 PM sessions (804, 806) as there are two ingress Line cards B1 and B2 where PM session stitching is required. As indicated by PM session 804 in FIG. 8, the performance delay associated with the Forwarding path A-B1-B3-C1 (includes delay from Line Card B1 to Fabric queue on Node B) is equal to (2+5=) 7 μsec. Similarly, as indicated by PM session 806, the performance delay associated with the Forwarding path A-B2-B3-C1 (includes delay from Line Card B2 to Fabric queue on Node B) is equal to (4+5=) 9 μsec.

Figure 9:
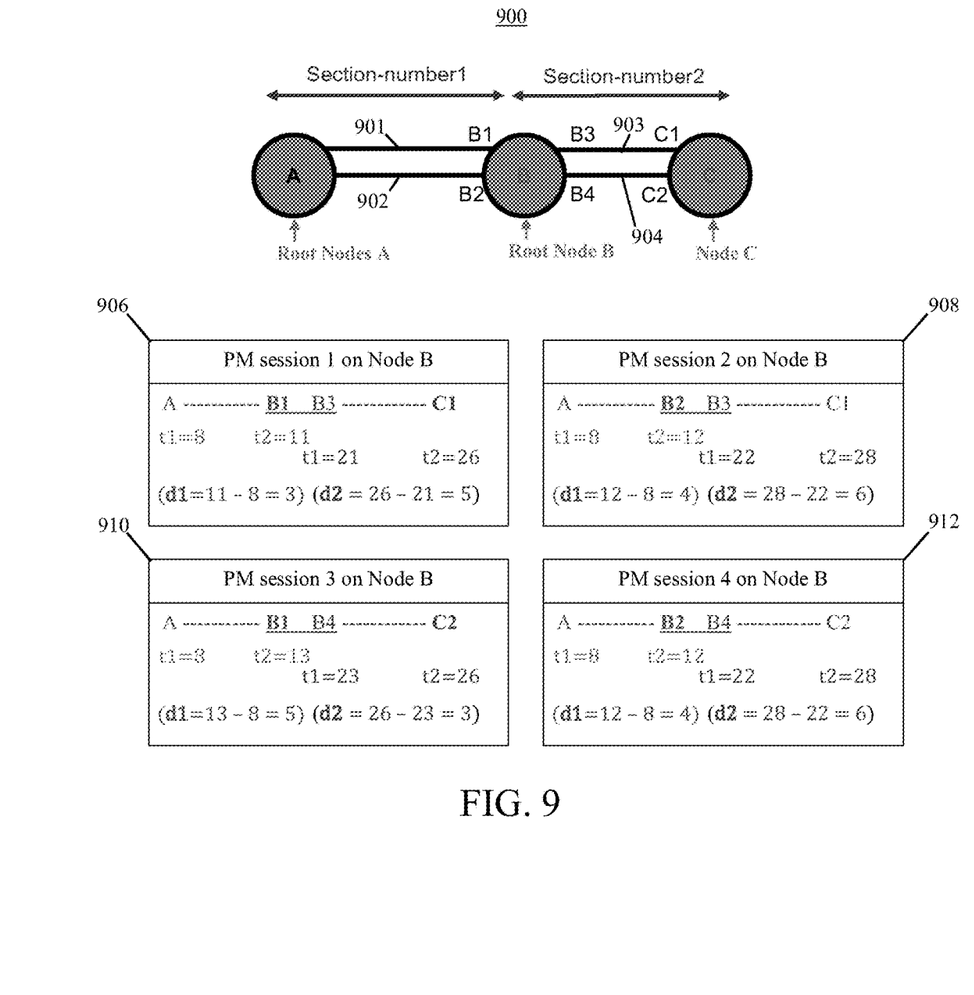
FIG. 9 illustrates an example SR Policy for end-to-end delay computation involving PM session stitching, in accordance to some embodiments of the present technology.

Another example pertaining to SR Policy/Topology 900 is illustrated in FIG. 9. The example SR Policy/Topology 900 of FIG. 9 is similarly implemented on nodes A-B-C. There are 2 ECMP paths 901 and 902 between Nodes A and B and there are 2 ECMP paths 903 and 904 between nodes B and C. B1 and B2 are ingress Line Cards and B3 and B4 are egress Line Cards on Root-Node B. C1 and C2 are ingress Line Cards on node C. Node B creates 4 PM sessions as there are two ingress Line cards B1 and B2 where PM session stitching is required and there are 2 ECMP paths in its section. As indicated by 906 and 908 in FIG. 9, the performance delay associated with the Forwarding path A-B1-B3-C1 and A-B2-B3-C1 is equal to (3+5=) 8 μsec and (4+6=) 10 μsec, respectively. Similarly, as indicated by 910 and 912, the performance delay associated with the Forwarding path A-B1-B4-C2 and A-B2-B4-C2 is equal to (5+3=) 8 μsec and (4+6=) 10 μsec, respectively.

In 5G network with network slicing, there is a need to measure performance delay metrics of SR Policies for different traffic types using QoS fields (e.g. EXP/DSCP in IPv4/IPv6 header). As such, Some embodiment of the present technology provide a Quality of Service (QoS) aware delay measurement system. PM probes can be used with a requested QoS field (EXP/DSCP) to measure the performance delay values for the corresponding traffic. In some embodiments QoS field in the PM probe packets may be used to enable forwarding/sending probe packets to certain forwarding/hardware queues along the path. Some forwarding paths may be used for PM probe query messages with certain QoS field. Accordingly, QoS aware delay measurement, in accordance to some embodiments, may be used to steer the corresponding traffic away from the SR Policy when there is a degradation.

It should be noted that a SR policy may be created for SR-MPLS or SRv6 data-planes and although, PM probes packets may be shown with SR-MPLS encoding, it would be apparent to a Person of Ordinary Skill in the Arts that the solution applies equally to SRv6 data-plane, for which PM probe packets use IP/UDP packet encoding.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for implementing distributed delay measurement comprising:
   dividing a segment routing policy domain, established between an ingress node and an egress node, into a plurality of sections, wherein each section comprises a Root-Node and one or more paths originating from the Root-Node and spanning the section;
   creating one or more local delay measurement sessions at each Root-Node, wherein each of the one or more local delay measurement sessions corresponds to a different path from the one or more paths originating from the Root-Node; and
   calculating one or more end to end delay metrics for the segment routing policy domain by utilizing the one or more local delay measurements from each of the Root-Nodes along the segment routing policy domain.

2. The computer-implemented method of claim 1, wherein the one or more end to end delay metrics are associated with one or more end-to-end paths between the ingress node and the egress node.

3. The computer-implemented method of claim 1, wherein the sections, the paths spanning each of the sections and the corresponding Root-Nodes are determined by one or more delay measurement query messages sent by the ingress node.

4. The computer-implemented method of claim 3, wherein an extended link delay metric is used in the one or more delay measurement query messages sent by the ingress node.

5. The computer-implemented method of claim 4, wherein the extended link delay metric provides information that identifies the Root-Node for each downstream section and delay metrics for each path spanning the corresponding downstream section.

6. The computer-implemented method of claim 5, wherein the delay measurement query messages comprising the extended link delay metric are sent, by the ingress node, to one or more adjacent Root-Nodes and forwarded thereon to each of one or more downstream Root-Nodes.

7. The computer-implemented method of claim 1, wherein a centralized controller is used to setup the sections, Root-Nodes and the one or more paths spanning each of the sections in the segment routing policy domain.

8. The computer-implemented method of claim 1, wherein the one or more local delay measurements at each Root-Nodes include an internal fabric delay within the Root-Node.

9. The computer-implemented method of claim 1, wherein the one or more local delay measurements at each of the Root-Nodes include one or more input/output line card delays.

10. The computer-implemented method of claim 1, wherein the local delay measurement sessions are created at select Root-Nodes, such that the distributed delay performance measurement is carried out only for select Sections along the segment routing policy domain.

11. A non-transitory computer-readable storage medium comprising instructions stored therein, which when executed by one or more processors, cause the processors to perform operations comprising:
   partition a segment routing policy domain, established between an ingress node and an egress node, into a plurality of Sections, wherein each section comprises a Root-Node and one or more paths originating from the Root-Node and spanning the Section;
   create one or more local delay measurement sessions at each Root-Node, wherein each of the one or more local delay measurement sessions corresponds to a different path from the one or more paths originating from the Root-Node and spanning the Section; and
   calculate one or more end to end delay metrics for the segment routing policy domain by utilizing the one or more local delay measurements from each of the Root-Nodes along the segment routing policy domain.

12. The one or more non-transitory computer-readable medium of claim 11, wherein the one or more end to end delay metrics are associated with one or more end-to-end paths between the ingress node and the egress node.

13. The one or more non-transitory computer-readable medium of claim 11, wherein the Sections, the paths spanning each of the Sections and the corresponding Root-Nodes are determined by one or more delay measurement query messages sent by the ingress node.

14. The one or more non-transitory computer-readable medium of claim 13, wherein an extended link delay metric is used in the one or more delay measurement query messages sent by the ingress node.

15. The one or more non-transitory computer-readable medium of claim 14, wherein the extended link delay metric provides information that identifies the Root-Node for each downstream section and delay metrics for each path spanning the corresponding downstream section.

16. The one or more non-transitory computer-readable medium of claim 15, wherein the one or more delay measurement query messages are sent, by the ingress node, to one or more adjacent Root-Nodes and forwarded thereon to each of one or more downstream Root-Nodes.

17. The one or more non-transitory computer-readable medium of claim 11, wherein a centralized controller is used to setup the sections, Root-Nodes and the one or more paths spanning each of the sections in the segment routing policy domain.

18. The one or more non-transitory computer-readable medium of claim 11, wherein the one or more local delay measurements sessions at each Root-Node include an internal fabric delay within the Root-Node.

19. The one or more non-transitory computer-readable medium of claim 11, wherein the one or more local delay measurements sessions at each Root-Node include one or more input/output line card delays.

20. A system comprising:
a controller unit in communication with one or more segment routing capable nodes associated with a segment routing policy processors;
a communication interface disposed between the controller unit and the one or more segment routing capable nodes, wherein the communication interface facilitate communication between the controller unit and the one or more segment routing capable nodes, wherein
  the controller unit, acting through the communication interface, designates one or more segment routing capable nodes as Root-Nodes, wherein
  the controller unit initiate one or more Root-Nodes to establish one or more local delay measurement sessions, wherein
  each of the one or more local delay measurement sessions corresponds to a different path established between the Root-Node and one or more adjacent downstream Root-Nodes, wherein
  the controller unit calculates one or more end to end delay metrics for the segment routing policy domain by utilizing the one or more local delay measurements from each of the Root-Nodes along the segment routing policy domain.

* * * * *